United States Patent
Patton et al.

(10) Patent No.: US 10,346,674 B2
(45) Date of Patent: *Jul. 9, 2019

(54) SAFE ILLUMINATION FOR COMPUTERIZED FACIAL RECOGNITION

(71) Applicant: Bally Gaming, Inc., Las Vegas, NV (US)

(72) Inventors: Stephen Patton, Reno, NV (US); Martin Lyons, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 712 days.

This patent is subject to a terminal disclaimer.

(21) Appl. No.: 14/930,654

(22) Filed: Nov. 2, 2015

(65) Prior Publication Data

US 2016/0055372 A1    Feb. 25, 2016

Related U.S. Application Data

(63) Continuation of application No. 14/172,139, filed on Feb. 4, 2014, now Pat. No. 9,177,193, which is a
(Continued)

(51) Int. Cl.
*A63F 9/24* (2006.01)
*G06K 9/00* (2006.01)
(Continued)

(52) U.S. Cl.
CPC ............ *G06K 9/00288* (2013.01); *A63F 9/24* (2013.01); *A63F 13/213* (2014.09); *A63F 13/23* (2014.09);
(Continued)

(58) Field of Classification Search
CPC ........ A63F 13/213; A63F 13/23; A63F 13/90; A63F 9/24; G06F 3/013; G06K 9/00228;
(Continued)

(56) References Cited

U.S. PATENT DOCUMENTS 6,234,900 B1 * 5/2001 Cumbers ............ G06K 9/00597
235/380
7,466,847 B2 * 12/2008 Komura .................. B60R 25/25
382/118
(Continued)

*Primary Examiner* — Siamak Harandi
(74) *Attorney, Agent, or Firm* — Marvin A. Hein

(57) ABSTRACT

In an embodiment, a method is provided. The method includes setting an IR (infrared) level to a first predetermined level. The method also includes reading an image and determining if a face is detected. If a face is not detected, the method sets the IR level to zero and waits a first predetermined amount of time. The method further includes repeating the setting the IR level to the first predetermined level and the reading an image. The method also includes determining a face is detected. The method further includes setting the IR level to a second predetermined level. The method also includes reading an image and determining if a face is recognized. The method may further include setting the IR level to zero and waiting a second predetermined amount of time. The method may also include setting the IR level to the first predetermined level, reading an image and determining if a face is detected.

20 Claims, 7 Drawing Sheets

Related U.S. Application Data continuation of application No. 12/957,359, filed on Nov. 30, 2010, now Pat. No. 8,644,564.

(51) Int. Cl.
  *G06K 9/20* (2006.01)
  *A63F 13/213* (2014.01)
  *A63F 13/23* (2014.01)
  *A63F 13/90* (2014.01)
  *G06F 3/01* (2006.01)
  *H04N 5/225* (2006.01)
  *H04N 5/232* (2006.01)
  *H04N 5/33* (2006.01)

(52) U.S. Cl.
  CPC .............. *A63F 13/90* (2014.09); *G06F 3/013* (2013.01); *G06K 9/00228* (2013.01); *G06K 9/00255* (2013.01); *G06K 9/2027* (2013.01); *H04N 5/2252* (2013.01); *H04N 5/23229* (2013.01); *H04N 5/33* (2013.01); *A63F 2009/2402* (2013.01); *A63F 2009/2435* (2013.01); *A63F 2009/2451* (2013.01)

(58) Field of Classification Search
  CPC .......... G06K 9/00255; G06K 9/00288; G06K 9/2027; H04N 5/2252; H04N 5/23229; H04N 5/33
  See application file for complete search history.

(56) References Cited

U.S. PATENT DOCUMENTS

| | | | |
|---|---|---|---|
| 2006/0158715 A1* | 7/2006 | Furusawa | B60J 3/04 359/265 |
| 2009/0176566 A1* | 7/2009 | Kelly | G07F 17/32 463/29 |
| 2010/0254571 A1* | 10/2010 | Matsuura | G06K 9/00281 382/103 |

* cited by examiner

SAFE ILLUMINATION FOR COMPUTERIZED FACIAL RECOGNITION

CROSS REFERENCE TO RELATED APPLICATIONS

This application is a continuation of U.S. Ser. No. 14/172,139, filed Feb. 4, 2014, now U.S. Pat. No. 9,177,193, which is a continuation of U.S. Ser. No. 12/957,359, filed Nov. 30, 2010, now U.S. Pat. No. 8,644,564, both of which are incorporated herein by reference.

BACKGROUND

Facial recognition systems are well known. The use of infra-red illumination to assist the capture images for the facial recognition systems is less prevalent. Most facial recognition systems work in environments with adequate conventional lighting, such as in an airport. However, an infra-red illumination system for a facial-recognition system may be useful in venues that do not have enough ambient lighting to support adequate capture of images. As an example, casinos and bars tend to be relatively dark environments. Installing adequate conventional lighting is often not feasible and may be undesirable as being unsuitable to the desired ambiance.

One problem with infra-red illumination is that it loses some of the potential data that might be used to make a facial recognition match due, in part, to the fact that the captured image is essentially monochromatic. Another problem with infra-red illumination is that when it is shined in a person's eyes it does not cause a dilated pupil to contract. Even though infra-red light is not as inherently harmful as visible light (because of its longer wavelength) more of it will reach the retina due if the pupil is dilated. This effect is further exacerbated by a dark environment such as a bar where a person's eyes are generally more dilated.

This problem is not usually of concern with facial recognition systems because the designers of such systems, which are mainly oriented towards surveillance, do not expect: (a) the user to have a long or continuous exposure to the illumination; or (b) the user to be staring directly at the source of the illumination. However, if one is to use a facial recognition system with a persistent infrared (IR) light source it may be useful to find ways to mitigate the possibility of over-exposure to such IR light.

One type of system which uses IR illumination is a system which tracks gazes, e.g. the movement of the human eye. For example, one type of system uses an IR gaze tracking system to assist handicapped persons in their use of computers by tracking their eye movements. Such systems require the user to spend long periods with IR illumination exposure.

It is believed that the risks due to IR illumination exposure of this type are small with point sources of IR light used within a well-lit room. However, the effects of long-term exposure to of multiple sources of IR light in dimly lit rooms are not well documented.

SUMMARY

Certain examples, embodiments and advantages are set forth herein by way of example and not limitation.

By way of non-limiting example, a system comprises a cabinet, a first display mounted in the cabinet, a processor coupled to the first display and mounted in the cabinet, a second display mounted in the cabinet and coupled to the processor, an image acquiring device (e.g. a digital camera) mounted in the cabinet, the image acquiring device sensitive to infrared illumination, the image acquiring device coupled to the processor, a light source (e.g. a plurality of light emitting diodes or "LEDs") mounted in the cabinet in proximity to the image acquiring device and coupled to the processor, a facial recognition module operated by the processor in conjunction with the image acquiring device and the plurality of LEDs; and a facial detection module operated by the processor in conjunction with the image acquiring device and the plurality of LEDs.

By way of further non-limiting example, a method comprises setting an IR (infrared) value to zero, determining if a face can be recognized, if a face cannot be recognized, determining if a face can be detected, if a face cannot be detected, increasing an infrared value and determining if a face can be detected, setting a face detection IR value based on detection of a face; and setting a face recognition IR value based on recognition of a face.

By way of still further non-limiting example, a method comprises setting an IR (infrared) level to a first predetermined level, reading an image, determining if a face is detected and, if a face is not detected, setting the IR level to zero, waiting a first predetermined amount of time, repeating the setting the IR level to the first predetermined level and the reading an image, determining a face is detected, setting the IR level to a second predetermined level, reading an image, and determining if a face is recognized.

One or more advantages may be realized in certain example embodiments. For example, lower IR illumination may be required for facial recognition purposes. Furthermore, in areas with multiple units, a lower overall illumination may be achieved. Also, with certain example embodiments, it is possible to calibrate the correct IR illumination for a particular environment and/or to provide automatic orientation and synchronization of IR illumination to prevent back-lighting causing image capture issues.

These and other examples, embodiments and advantages will become apparent to those of skill in the art upon a study of the specification and drawings set forth here.

BRIEF DESCRIPTION OF THE DRAWINGS

The drawings and descriptions set forth herein should be understood as illustrative rather than limiting. In the drawings.

DETAILED DESCRIPTIONS

A system, method and apparatus are provided for safe illumination for facial recognition. The specific embodiments described in this document represent examples within the scope of inventions disclosed herein and are illustrative in nature rather than restrictive.

In the following descriptions, for purposes of explanation, specific details are set forth in order to provide an understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
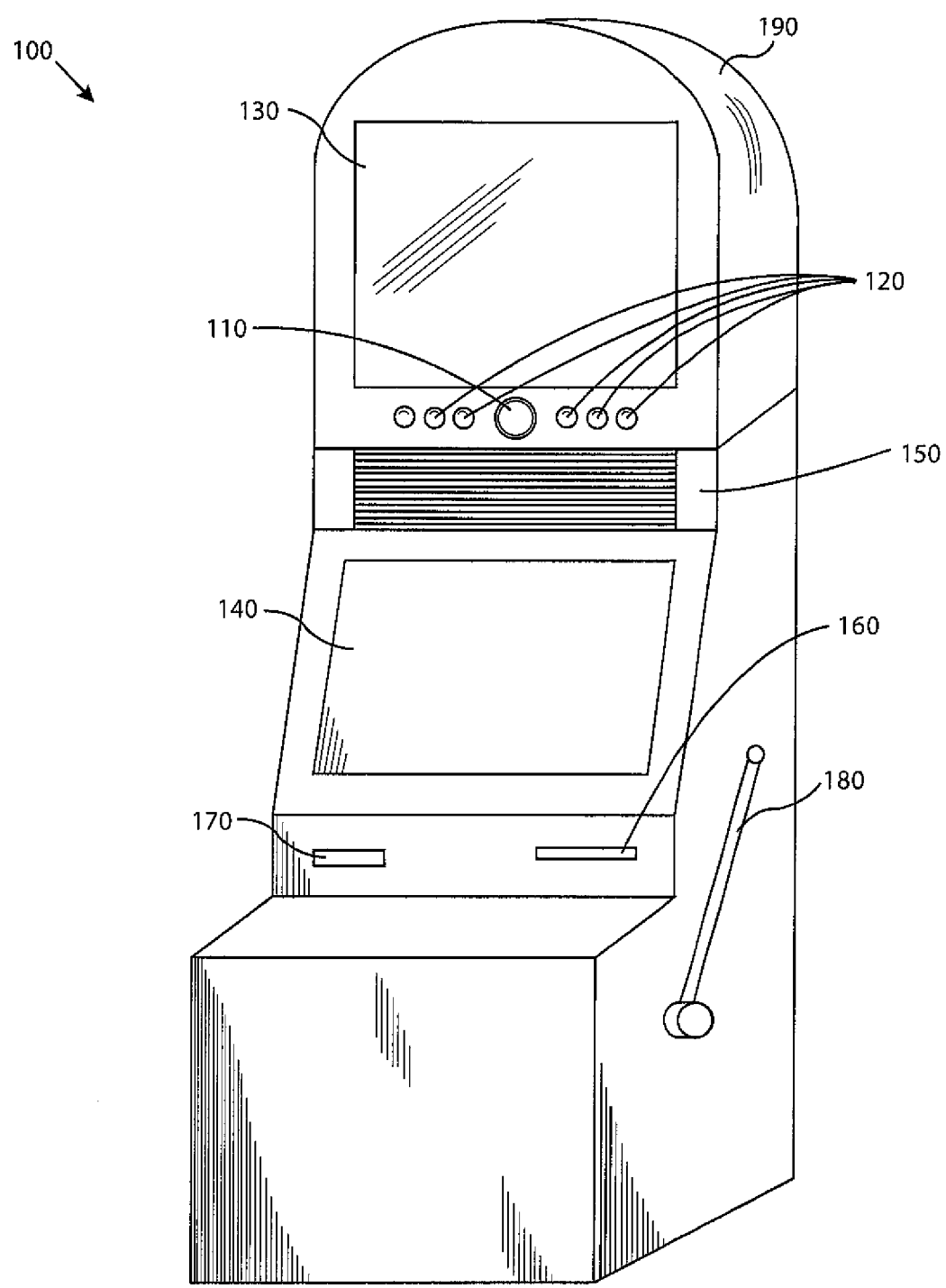
FIG. 1 is an example of a gaming cabinet or similar device.

An image acquiring device and illumination enabled cabinet, as set forth by way of non-limiting example in FIG. 1, can be used with various embodiments. The image acquiring device can be, by way of non-limiting examples, a digital camera, a photodiode array, an infrared sensor, etc. The illumination can, by way of non-limiting example, include an array of infrared emitting LEDs (light emitting diodes). Typically, these give out little to no visible light, and are used to provide proper illumination for the image acquiring device which is also configured to produce images in the infrared spectrum. The IR LEDs are configured in an embodiment to be under software control, with the LED brightness can be controlled by varying the voltage supplied, and the voltage supply controlled by software through a connection (coupling) between the IR LEDs and a processor executing the software.

Working in conjunction with the IR LEDs in some embodiments is facial recognition software. Facial recognition software may be understood as operating by receiving an image taken from the image acquiring device, and by providing a possible match (or set of matches) of users identified as a result. Such facial recognition software is typically available in various forms.

In addition to facial recognition software, facial detection software is used in some embodiments. Compared to recognition, facial detection is a much 'easier' problem for computers to solve, but is quite different from facial recognition. While facial recognition software returns matches to particular faces, facial detection software simply returns a count of the number of face-like objects found in the supplied image. In some implementations facial recognition software may be used for facial detection, but only through a separate software interface, where any faces detected are not attempted to be recognized. Conventionally, facial detection is not a required part of a biometric identification system—the biometric software is only concerned with identifying a user, and not with simply detecting a user.

A property of facial detection allows for a reduction in the overall IR illumination required to implement a facial recognition system. Facial recognition requires more illumination than facial detection. In some embodiments, therefore, a system operates the biometric identification system such that it only operates at the higher illumination level required for facial recognition for brief periods of time—after a face has been detected (at a lower IR illumination level) and then not again until, preferably, it is clear that the first user has left and been replaced with another user.

Various embodiments are described herein. In one embodiment, a system is provided. The system includes a cabinet and a first display mounted in the cabinet. The system further includes a processor coupled to the first display and mounted in the cabinet. The system also includes a second display mounted in the cabinet and coupled to the processor. The system further includes a image acquiring device mounted in the cabinet. The image acquiring device is, in this example, preferably sensitive to infrared illumination and the image acquiring device is coupled to the processor. The system also includes a plurality of LEDs (light emitting diodes) mounted in the cabinet in proximity to the image acquiring device and coupled to the processor. Additionally, the system includes a facial recognition module operated by the processor in conjunction with the image acquiring device and the plurality of LEDs. Moreover, the system includes a facial detection module operated by the processor in conjunction with the image acquiring device and the plurality of LEDs.

In another embodiment, a method is provided. The method includes setting an IR (infrared) value to zero. The method also includes determining if a face can be recognized. If a face cannot be recognized, the method includes determining if a face can be detected. If a face cannot be detected, the method increases an infrared value and determining if a face can be detected. The method further includes setting a face detection IR value based on detection of a face. The method also includes setting a face recognition IR value based on recognition of a face.

In yet another embodiment, a method is provided. The method includes setting an IR (infrared) level to a first predetermined level. The method also includes reading an image and determining if a face is detected. If a face is not detected, the method sets the IR level to zero and waits a first predetermined amount of time. The method further includes repeating the setting the IR level to the first predetermined level and the reading an image. The method also includes determining a face is detected. The method further includes setting the IR level to a second predetermined level. The method also includes reading an image and determining if a face is recognized. The method may further include setting the IR level to zero and waiting a second predetermined amount of time. The method may also include setting the IR level to the first predetermined level, reading an image and determining if a face is detected.

One may understand further with reference to the figures. FIG. 1 illustrates a cabinet housing an EGM (electronic gaming machine) or other similar device. Device 100 includes a cabinet 190, displays 130 and 140, grill 150 (which may cover a speaker, not shown, for example). Device 100 also includes on cabinet 190 a first interface 160 and a second interface 170, along with a handle 180. Additionally, image acquiring device 110 and IR illumination LEDs (light emitting diodes) 120 are provided on cabinet 190. Note that first interface 160 and second interface 170 may be used to interact with various different things, such as credit cards, loyalty cards, RFID (radio-frequency identification), currency, tickets, and other things. The first interface and second interface may be designed to interact with user identification materials (e.g. loyalty cards, credit cards, etc.) and materials representing value (e.g. currency, scrips, credit cards, etc.) Note that device 100 may also include buttons used to play a game (not shown) and may be coupled to a loyalty system which tracks operations of device 100 and interactions of a user with the loyalty system through devices such as device 100.

Figure 2:
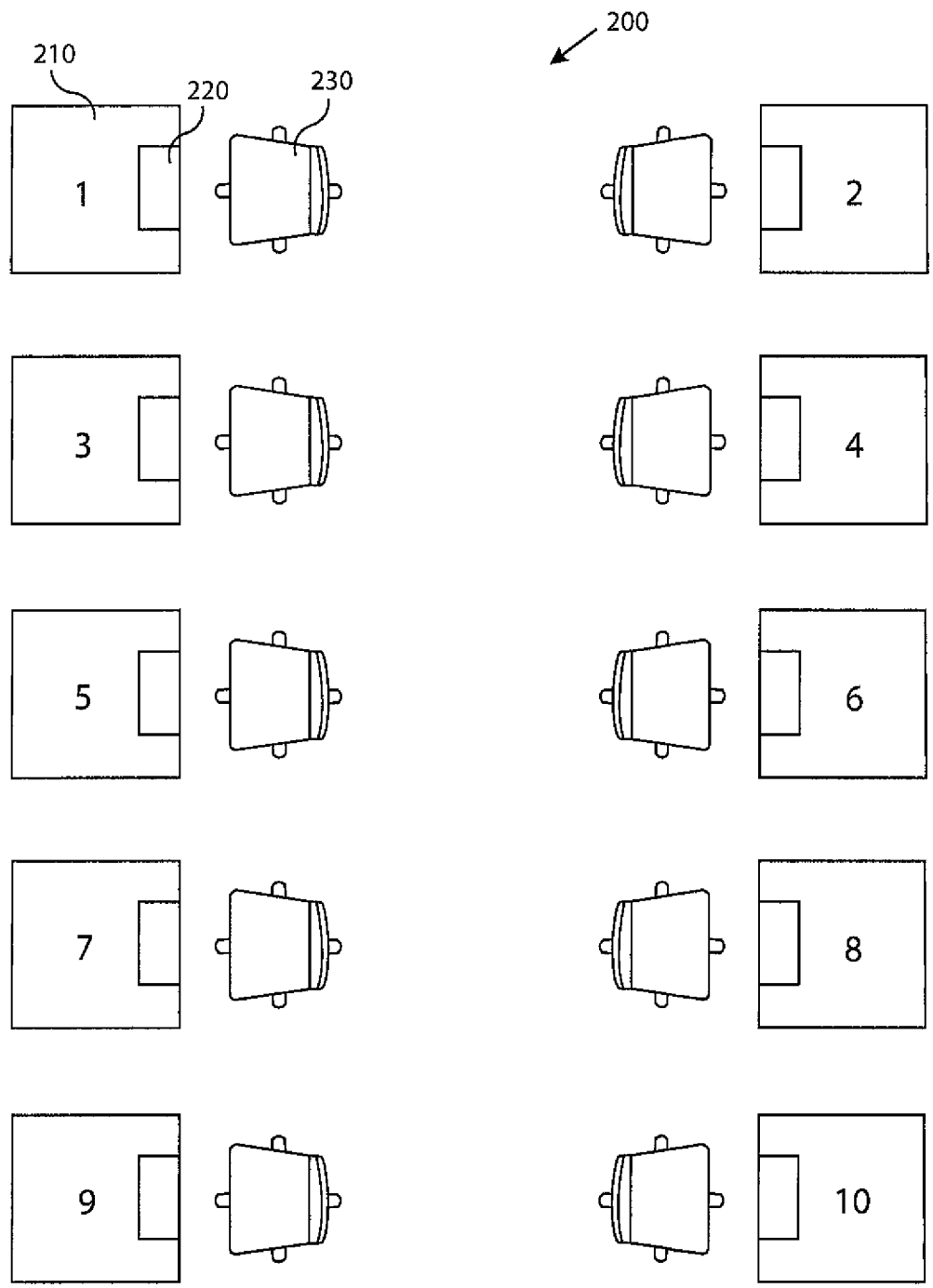
FIG. 2 is an example of a configuration of gaming cabinets.

A device such as device 100 may be deployed in various configurations. Two such configurations are provided for illustration an ease of reference, and will be discussed further below. In FIG. 2, a configuration 200 has EGM cabinets 210, including IR arrays 220 are arranged with seats 230 (seats are optional) in two banks, facing each other. Each cabinet 210 is numbered for ease of reference.

Figure 3:
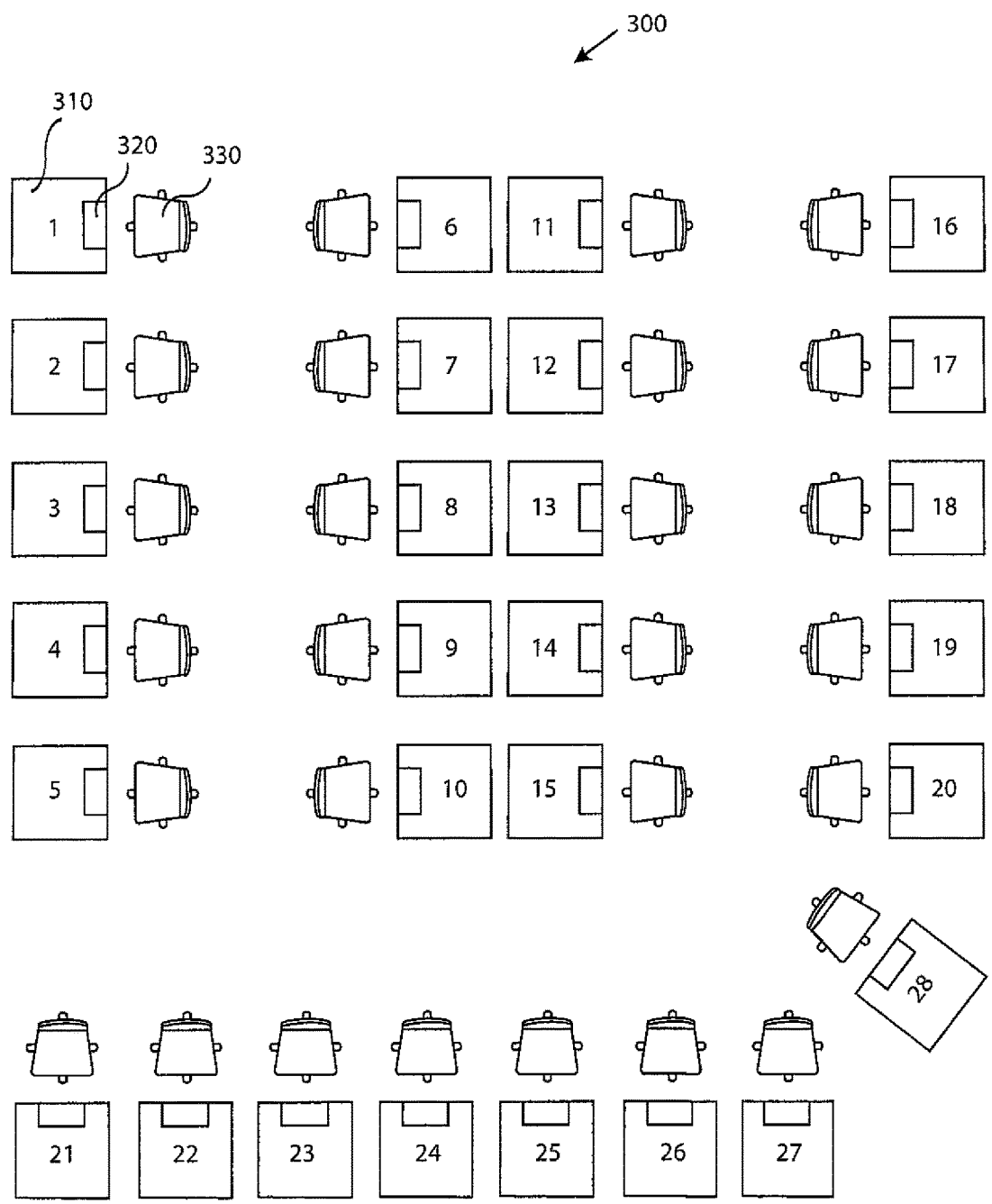
FIG. 3 is another example of a configuration of gaming cabinets.

In FIG. 3, another configuration 300 is provided. EGM cabinets 310 with IR arrays 320 and seats 330 (optional) are provided with some cabinets facing each other and other cabinets without visual contact.

Figure 4:
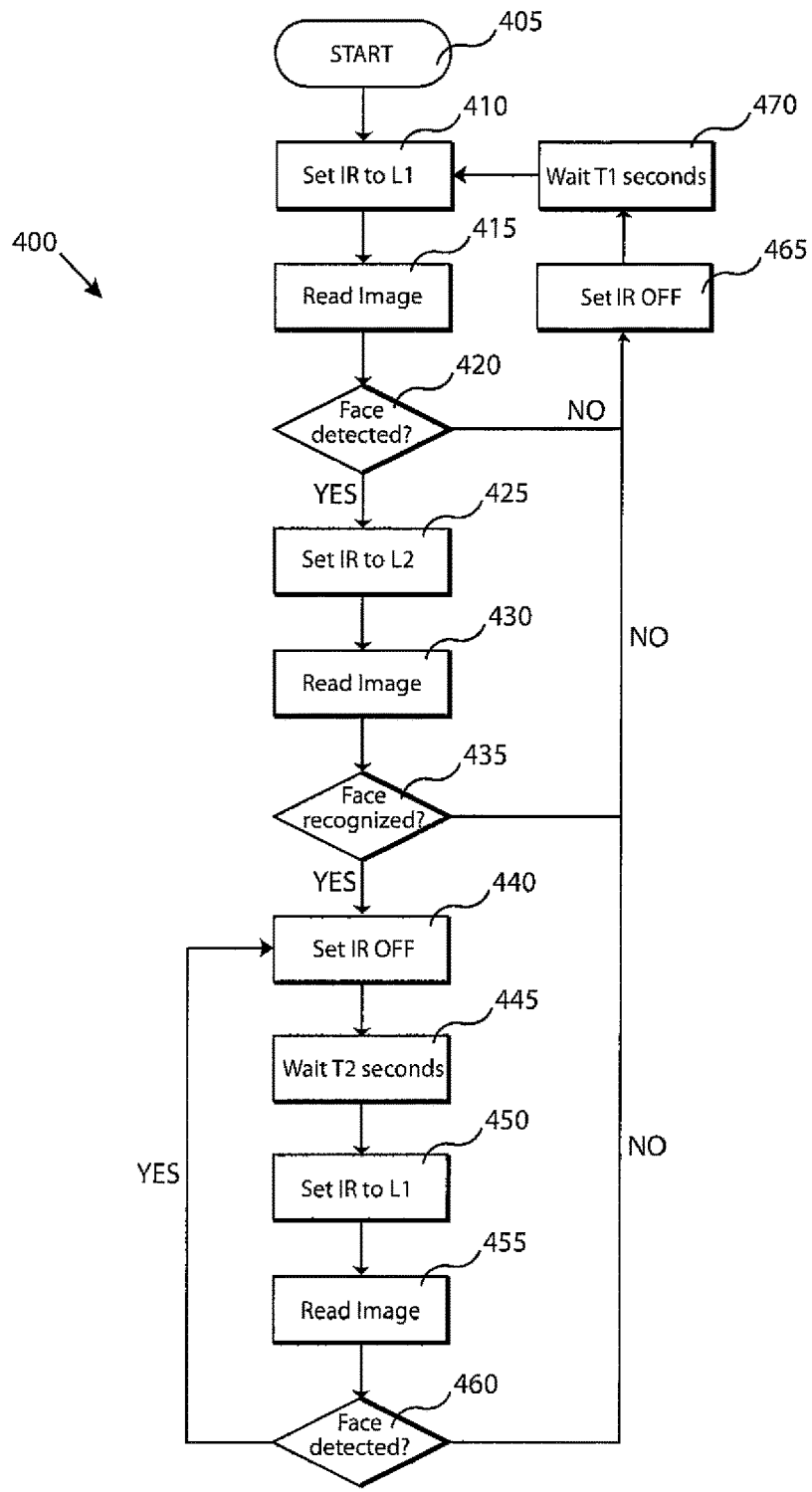
FIG. 4 illustrates an example process of operating an IR LED and digital camera.

FIG. 4 illustrates, by way of non-limiting example, how this may be achieved. In an embodiment, two illumination levels are defined—L1 and L2. L1 represents the illumination required to perform a successful facial detection. L2 represents the illumination required to perform a successful facial recognition. A method to derive these values is described below. The process in FIG. 4 may be run continuously, at all times that facial recognition was employed.

The process initiates at module 405. The IR LEDs are supplied with a voltage to produce the L1 level illumination at module 410. An image is then read by the image acquiring device, and passed to the facial detection software module at module 415. This module returns a count of the number of faces detected. Preferably, this count is restricted to faces that are immediately sat in front of the gaming machine, and this restriction can be performed by ensuring that faces detected are of at least a minimum size. A determination is made at module 420 as to whether any faces have been detected.

If no face is detected, the IR LEDs are switched off at module 465, and the process waits for a suitable number of seconds (T1) at module 470. T1 can be set to a reasonable value based upon operator preference—a wait of 30 seconds could miss a player playing a few games, but this may not be a problem if the aim of the system is to prevent a player that has previously self-excluded from playing a significant session, for example. Regardless, it can be seen that a brief illumination of, say 1/10th of a second every 30 seconds would be less intrusive to passers-by or casino staff in the area than constant illumination, especially at the lower illumination level for facial detection.

If a face is detected at module 415, the IR LEDs are supplied with a higher voltage to produce the L2 level illumination at module 425. This is necessary for correct facial recognition. An image is read by the image acquiring device, and passed to the facial recognition software module at module 430. A determination is then made at module 435 as to whether a face has been recognized. If this software module does not recognize a known player, then the process switches off the IR LEDs at module 465, waits again for T1 seconds at module 470, and continues the normal facial detection loop.

If the software does recognize a known player, then suitable action may be taken (such as enabling certain bonusing, or restricting the player's ability to gamble in some way). From the perspective of this process, the IR LEDs are switched off at module 440, and the process waits for a suitable number of seconds (T2) at module 445. Module 440 may also include sending a message to another process to trigger the suitable actions mentioned above, or that message may originate from the facial recognition software (as opposed to the present LED management process).

It is expected that T2 would be lower than T1–5 seconds in one embodiment. One purpose of having a lower delay is to more accurately detect when the player has left the gaming machine. After T2 seconds, the IR LEDs are set to produce L1 level illumination at module 450, and facial detection is performed at module 455. If a face is detected (as determined at module 460), it is assumed that the same player is still present, but if no face is detected, the session is ended (so bonusing or player tracking may be disabled or other action taken). This may involve a message triggered by the determination of module 460 to the rest of the system, for example. Once the session is ended, the process continues again from the beginning through modules 465 and 470.

As an enhancement to the above process in some embodiments, facial recognition (at an L2 level of illumination) may be periodically performed, say every 60 seconds, during the time when it is known that a face has been detected. This would reduce the effect of a player leaving and being replaced by another player during the T2 period.

As a further enhancement, the gaming machine may be configured to receive a synchronization signal from a server for this process. The synchronization signal may be sent from the server to each gaming machine operating an embodiment in turn, but spaced at a suitable interval, which may be random or evenly spread. The purpose of this signal would be to reduce the number of gaming machines enabling IR illumination at the same time—if IR is enabled for 1/10th of a second every 30 seconds, and there are 300 gaming machines, it would be possible for each gaming machine to be synchronized such that their illumination periods did not coincide with one another. This would again reduce the overall IR illumination in a casino. As an alternative, no synchronization signal would be needed if T1 and T2 were randomly varied by each gaming machine by a small amount. This variation could take place at each iteration of the process shown in FIG. 4, or be set at initial boot time. While not perfect, this approach would also reduce the overall illumination significantly.

Another issue addressed by this invention is that digital image capture performance can be negatively affected by the presence of lighting behind a subject. This is known as 'back-lighting', and the presence of back-lighting can cause the circuitry in an image acquiring device (such as a digital camera in a non-limiting example) to raise the 'shutter speed' to compensate. This raising of shutter speed has the unintended effect of darkening the subject being captured, and thus lowering facial recognition and detection performance.

As such, in one implementation, each EGM may be assigned to a logical collection, or bank of EGMs. This logical collection would match a physical arrangement and would be done at installation time. An example of such a physical arrangement may be seen in FIG. 2. In one embodiment, there are 10 EGMs, arranged as two banks of 5 machines, and each bank faces the other. During installation, EGMs 1, 3, 5, 7 and 9 are assigned to bank A, and EGMs 2, 4, 6, 8 and 10 are assigned to bank B. Each EGM in hank A receives a synchronization signal from a server periodically; this signal consists of (1) the current time, (ii) the next (offset) time to enable IR illumination and (iii) the period after this time to repeat the illumination. So an example for an embodiment might be that the signal consists of (i) 12:00:00 AM, (ii) 12:00:10 AM, and (iii) 10 seconds. Each EGM in bank B also receives a signal. In this case, it may consist of (i) 12:00:00 AM, (ii) 12:00:05 AM and (iii) 10 seconds.

Each EGM follows the pattern established by the signal, and it can be seen that as a consequence of this (assuming that the face detection/recognition period is much less than 5 seconds) no EGM in bank B has its IR array illuminated at the same time as an EGM in bank A. As well as reducing the overall IR illumination in a venue, this method potentially greatly assists the capture of a good candidate for facial detection/recognition, because it removes the possibility of back-lighting of the candidate user by an IR array at another EGM. So if a user was sat at EGM 5, there would be no possibility of interference with the operation of the face detection/recognition processes by lighting from EGM 6 (or even EGMs 4 and 8).

In more complex arrangements of EGMs, the determination of which bank an EGM may be assigned to may be performed by the use of data indicating the orientation of an EGM. In a preferred implementation, this may be done automatically, by use of a digital compass, as commonly found in mobile phones. Each EGM has a digital compass associated with it, and from this an orientation of the EGM can be derived. This orientation need only be coarse, and because all EGMs in a venue are located at the same global latitude, no calibration is necessary (the real magnetic 'north' is not important for this system, only that each EGM reports a consistent orientation). The EGM transmits this orientation value to the synchronization server.

As an example, FIG. 3 shows an arrangement of EGMs in a casino. In this example, an orientation value of 0 indicates that the front of the EGM, and therefore the IR illumination, is pointing 'north', an orientation value of 90 indicates that the EGM is pointing 'east', a value of 180 indicates 'south' and 270 indicates 'west'.

As such, the EGMs in FIG. 3 would report as follows: EGMs 1 to 5 and 11 to 15 would report a value of 90. EGMs 6 to 10 and 16 to 20 would report a value of 270. EGMs 21-27 would report a value of 0, and EGM 28 would report a value of 315.

The synchronization server may scale these values accordingly—perhaps to a range of 0-7. This would be done by calculating $R=(V*8/360)$, where R is the scaled range, and V is the reported orientation value. Each EGM would thus be assigned to a bank with a corresponding R value. In this case, EGMs 1 to 5 and 11 to 15 would be assigned to bank 2, EGMs 6 to 10 and 16 to 20 would be assigned to bank 6, EGMs 21 to 27 would be assigned to bank 0 and EGM 28 would be assigned to bank 7.

The number of banks active determines the number of intervals required. In this example there are 4 different banks (0, 2, 6 and 7) and thus the synchronization server splits the desired update period (the amount of time between a required facial detection/recognition update) into 4 and sends synchronization signals to each EGM with the corresponding 'next update time' set to the correct offset in the update period. So if the desired update period is 10 seconds, EGMs in bank 0 may receive an offset time of 0 seconds, bank 2 may receive an offset time of 2.5 seconds, bank 6 an offset time of 5 seconds, and bank 7 an offset time of 7.5 seconds.

In the absence of a digital compass, the orientation value of each EGM may be manually entered into the system by an operator.

Figure 5:
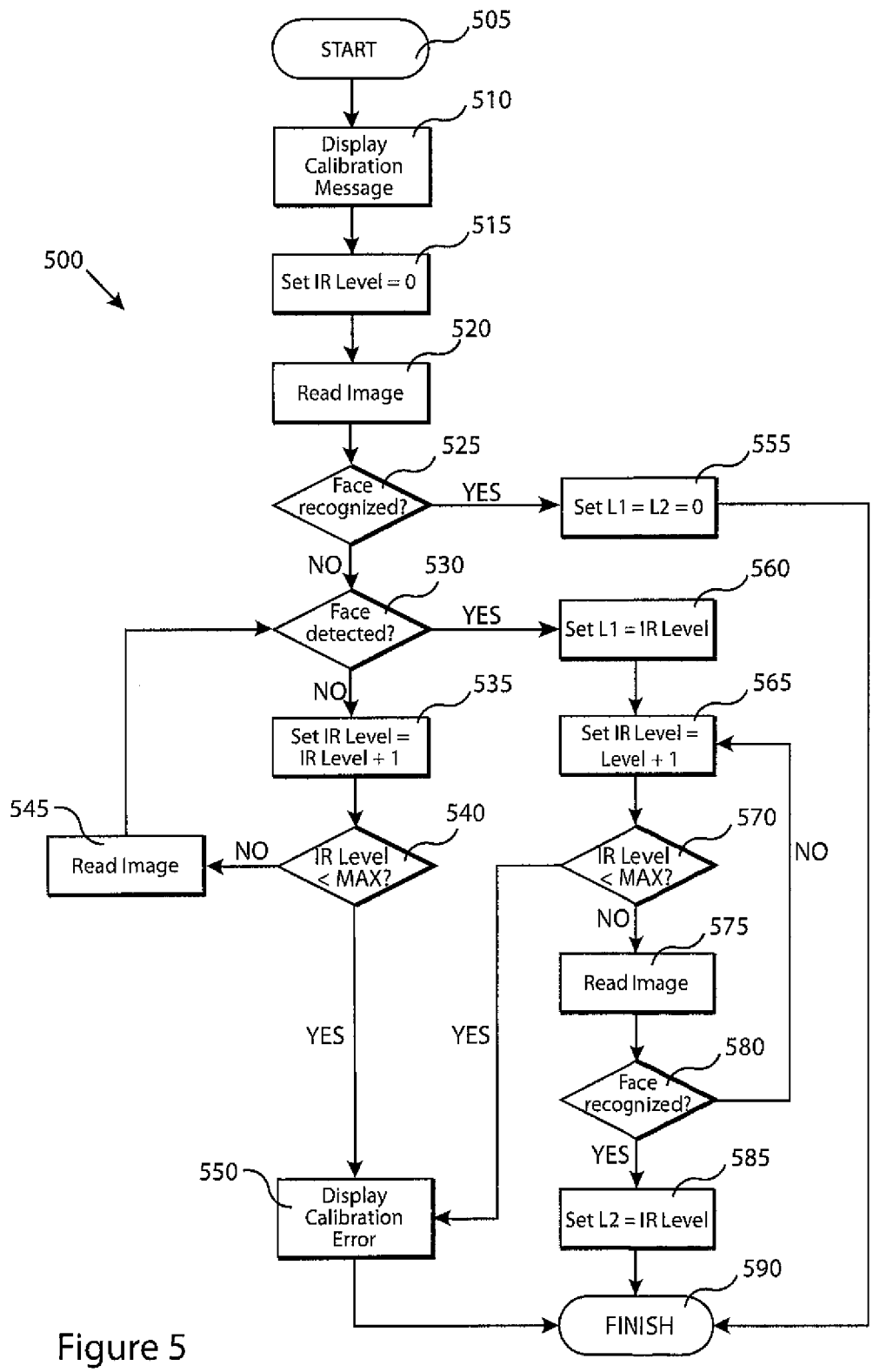
FIG. 5 illustrates an example process of a calibrating operation of an IR LED and digital camera.

As previously noted, the IR illumination levels L1 and L2 need to be defined. A calibration process for the derivation of these levels is shown in FIG. 5. The process 500 initiates at module 505. A user, usually a technician, initiates the calibration process in some embodiments, resulting in display of a calibration message at module 510. Preferably, their face may already be enrolled in the facial recognition system. If not they are asked to enroll before performing the calibration process.

In an implementation where server control of synchronization is present, the initiation of the calibration process causes the server to send a control signal to all other EGMs, or EGMs in alternative banks to temporarily disable their IR illumination. This need not be done, but is likely to allow for more effective calibration.

A message is shown to the user to present their face to the camera (the message of module 510). The IR illumination is switched off at module 515 and an image is read by the image acquiring device at module 520. If a face is successfully recognized as determined at module 525, it can be seen that the ambient light in the environment is enough to support facial recognition, and no IR illumination is required. Thus, L1 and L2 are set to 0 (i.e. off) at module 555 and the calibration process finishes at module 590.

If a face is not recognized, a facial detection test is performed at module 530. If a face is detected, it can be seen that the current illumination (initially none) is enough to support facial detection, and L1 is correspondingly set at module 560. Once a successful level is set for facial detection, the IR level is increased incrementally at module 565 and facial recognition is attempted at module 575 until a successful match is made using the loop of module 565, 570, 575 and 580. Module 580 provides a determination in this loop as to whether a face has been recognized. At this point, the corresponding illumination level is assigned to L2. If the IR level has increased to the maximum possible by the LED array (as determined at module 570), then the process fails at module 550 and further IR illumination may need to be installed.

If a face is not detected at module 530, the IR level is increased incrementally at module 535 and facial detection is attempted at module 545 until a face is successfully detected, using the loop of modules 530, 535, 540 and 545. At this point, the corresponding illumination level is assigned to L1, and then the process continues to set the L2 level for facial recognition. Again, if the IR level has increased to the maximum possible as determined at module 540 before a face is successfully detected, then the process fails at module 550 and further IR illumination may need to be installed.

The process as described in FIG. 5 is a process that is manually triggered, potentially at installation time. However, a similar process may be used automatically in some embodiments and how this may be achieved is now described. Periodically, the calibration process is triggered. The process may be triggered under two circumstances for example—first, when a player is sat at the gaming machine and has been successfully detected or recognized. In this case the process in FIG. 5 is performed without the initial module 510 of displaying a calibration message. Performing the process in this way may allow the illumination levels (L1 and L2) to be decreased if extra ambient light is present.

Second, a calibration process may be triggered when no face has been detected, and the purpose of the calibration is to ensure that L1 and L2 are not set at too low a level. In this scenario, the process is slightly modified to that shown in FIG. 6. In this process 600, rather than starting with a low IR level and increasing; instead the IR level is initially set at maximum and then reduced until a face is not detected. The process initiates at module 605, and the IR level is set to maximum at module 615. If a face is not detected at a highest illumination level at module 620, as determined at module 625, it is assumed that there is no face present at all and thus L1 and L2 are left unchanged at module 655.

Figure 6:
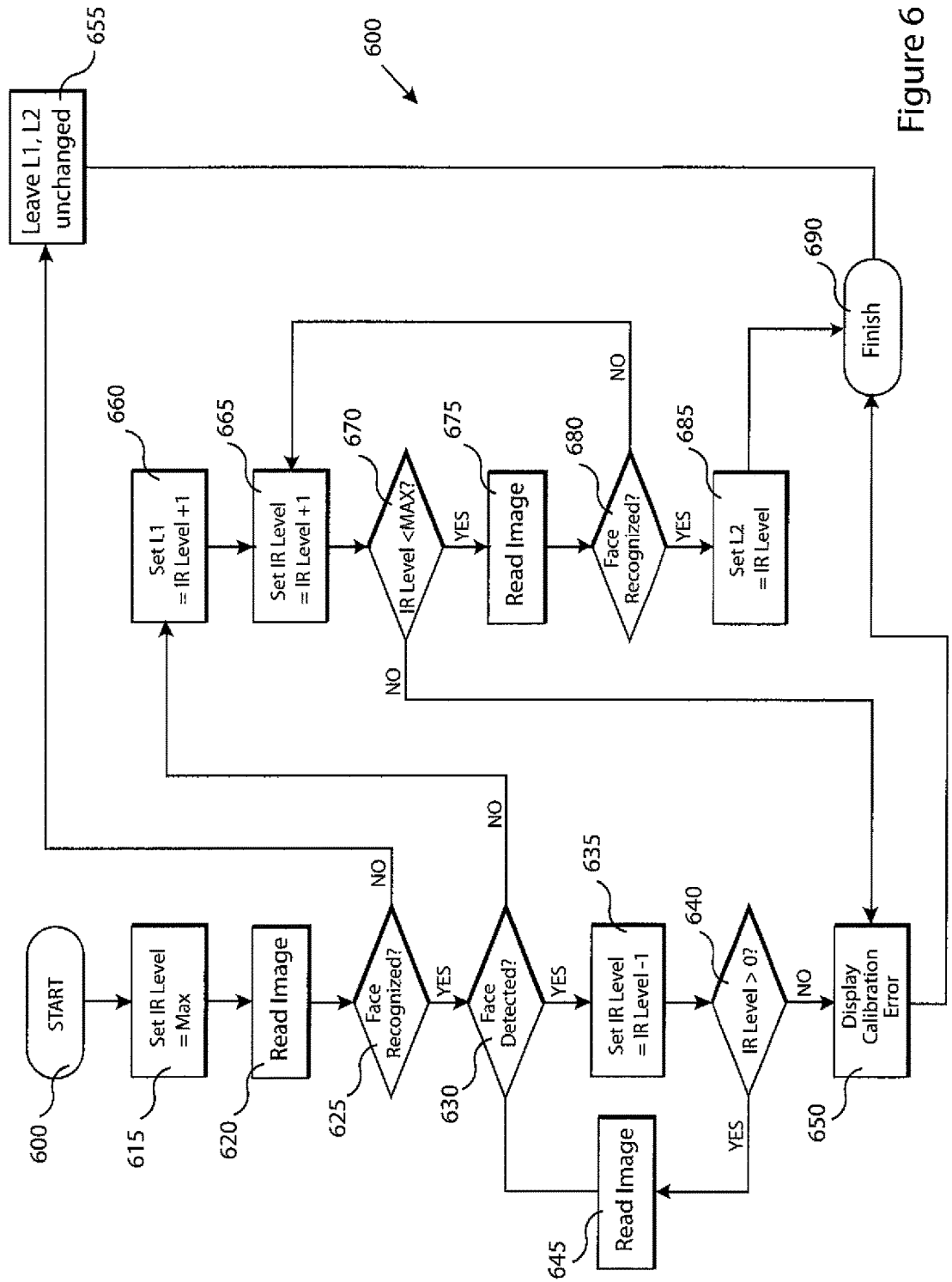
FIG. 6 illustrates another example process of calibrating operation of an IR LED and digital camera.

Once a face is no longer detected in the process shown in FIG. 6, L1 is set to the previous level where a successful detection was possible. This involves determining if a face was detected at module 630, decreasing an IR level at module 635, and determining if the IR level is above zero at module 640, before attempting facial detection again at module 645.

The IR illumination level is then increased until a face is recognized. This includes setting the IR level at module 660, increasing the IR level at module 665, determining if the IR level is under the maximum at module 670, detecting an image at module 675, and determining if a face is recognized at module 680. If a face is recognized, this is the new L2 level, as set at module 685. If a face is not recognized at the highest possible illumination, then L2 is not changed because it is possible that the user sat at the gaming machine is not one recognized by the system. An error message at module 650 may be displayed in some embodiments.

Figure 7:
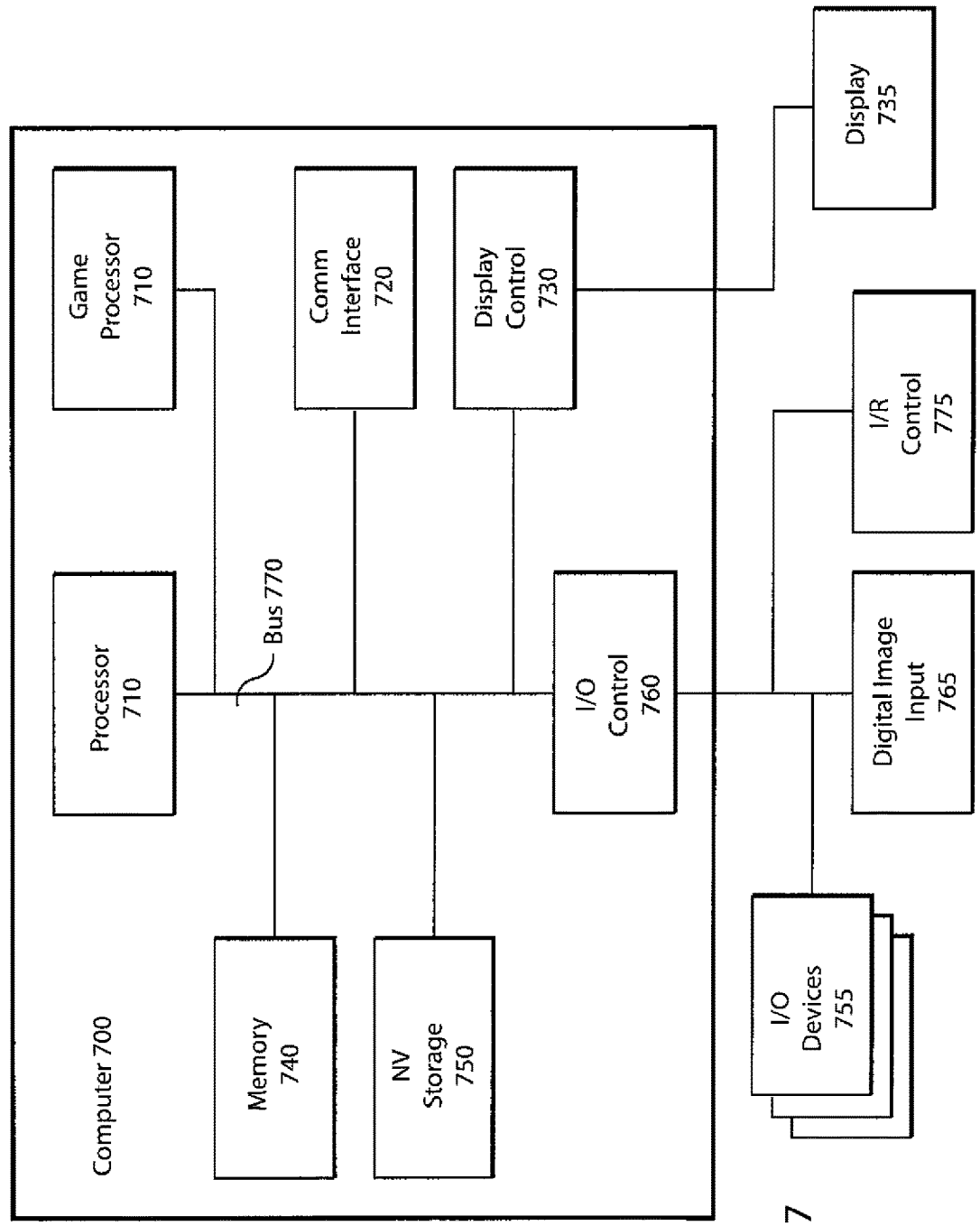
FIG. 7 illustrates an example gaming device or similar device in block diagram form.

FIG. 7 shows one example of a device that can be used as a gaming machine or processor for a console (e.g. an EGM), or may be used as a more conventional personal computer, as an embedded processor or local console, or as a PDA, for example. Such a device can be used to perform many functions depending on implementation, such as game playing, office software functions, internet access and communication functions, monitoring functions, user interface functions, telephone communications, two-way pager communications, personal organizing, or similar functions. The system 700 of FIG. 7 may also be used to implement other devices such as a personal computer, network computer, or other similar systems.

The computer system 700 interfaces to external systems through the communications interface 720. This interface may include some form of cabled interface for use with an immediately available personal computer and may also include a wireless interface, for example. Conventional systems often use an Ethernet connection to a network or a modem connection to the Internet, for example.

The computer system 700 includes a processor 710, which can be a conventional microprocessor such as an Intel microprocessor or Motorola microprocessor, a Texas instruments digital signal processor, or some combination of the various types or processors. Also provided is a game processor 710, which may be of the same type as processor 710, with different tasks assigned, for example. Memory 740 is coupled to the processor 710 by a bus 770. Memory 740 can be dynamic random access memory (DRAM) and can also include static ram (SRAM), or may include FLASH EEPROM, too. The bus 770 couples the processor 710 to the memory 740, also to non-volatile storage 750, to display controller 730, and to the input/output (I/O) controller 760. Note that the display controller 730 and I/O controller 760 may be integrated together, and the display may also provide input.

The display controller 730 controls in the conventional manner a display on a display device 735 which typically is a liquid crystal display (LCD) or similar flat-panel display. Display device 735 is used in the singular but may refer to multiple displays, such as the two displays of cabinet 190 and device 100 of FIG. 1. The input/output devices 755 can include a keyboard, or stylus and touch-screen, buttons, a handle, and may sometimes be extended to include disk drives, printers, a scanner, and other input and output devices, including a mouse or other pointing device. The display controller 730 and the I/O controller 760 can be implemented with conventional well known technology. A digital image input device 765 can be an image acquiring device which is coupled to an I/O controller 760 in order to allow images from the image acquiring device to be input into the device 700. In the case of the device 100 of FIG. 1, one may expect that I/R control 775 may control operation of LEDs (not shown) in conjunction with operation of digital image input device 765.

The non-volatile storage 750 is often a FLASH memory or read-only memory, or some combination of the two. A magnetic hard disk, an optical disk, or another form of storage for large amounts of data may also be used in some embodiments, though the form factors for such devices typically preclude installation as a permanent component of the device 700. Rather, a mass storage device on another computer is typically used in conjunction with the more limited storage of the device 700. Some of this data is often written, by a direct memory access process, into memory 740 during execution of software in the device 700. One of skill in the art will immediately recognize that the terms "machine-readable medium" or "computer-readable medium" includes any type of electronic storage device that is accessible by the processor 710.

The device 700 is one example of many possible devices which have different architectures. For example, devices based on an Intel microprocessor often have multiple buses, one of which can be an input/output (I/O) bus for the peripherals and one that directly connects the processor 710 and the memory 740 (often referred to as a memory bus). The buses are connected together through bridge components that perform any necessary translation due to differing bus protocols.

In addition, the device 700 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of an operating system software with its associated file management system software is the Palm® operating system and its associated file management system. The file management system is typically stored in the non-volatile storage 750 and causes the processor 710 to execute the various acts required by the operating system to input and output data and to store data in memory, including storing files on the non-volatile storage 750. Other operating systems may be provided by makers of devices, and those operating systems typically will have device-specific features which are not part of similar operating systems on similar devices. Similarly, Palm® operating systems may be adapted to specific devices for specific device capabilities.

Device 700 may be integrated onto a single chip or set of chips in some embodiments, and typically is fitted into a small form factor for use as a personal device. Thus, it is not uncommon for a processor, bus, onboard memory, and display/I-O controllers to all be integrated onto a single chip. Alternatively, functions may be split into several chips with point-to-point interconnection, causing the bus to be logically apparent but not physically obvious from inspection of either the actual device or related schematics.

Furthermore the methods disclosed above for the synchronization of the illumination period of each EGM in a bank are relevant regardless of the safety of IR illumination. During testing it has been found that back-lighting of a subject can cause facial detection and recognition performance to deteriorate. By ensuring that illumination from EGMs 'across the aisle' do not interfere with the facial recognition process, better performance can be achieved.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

One skilled in the art will appreciate that although specific examples and embodiments of the system and methods have been described for purposes of illustration, various modifications can be made without deviating from present invention. For example, embodiments of the present invention may be applied to many different types of databases, systems and application programs. Moreover, features of one embodiment may be incorporated into other embodiments, even where those features are not described together in a single embodiment within the present document.

What is claimed is:

1. An electronic gaming machine comprising:
   a cabinet housing;
   an infrared image acquiring device and an infrared light source coupled to the cabinet housing;
   a processor coupled to each of the infrared image acquiring device and the infrared light source; and
   a facial detection module and a facial recognition module, each operated by the processor in conjunction with the infrared image acquiring device and the infrared light source to recursively:
      turn off the infrared light source for a first predetermined amount of time;
      set an output level of the infrared light source to a first predetermined level;
      read a first image via the infrared image acquiring device;
      determine via the facial detection module if a face is detected in the first image;
      in response to detection of a face:
         set the output level of the infrared light source to a second predetermined level;
         read a second image via the infrared image acquiring device; and
         determine via the facial recognition module if a face is recognized in the second image.

2. The electronic gaming machine of claim 1, wherein the infrared light source comprises at least one light-emitting diode.

3. The electronic gaming machine of claim 1, wherein the first predetermined level represents an illumination level required to perform a successful facial detection.

4. The electronic gaming machine of claim 1, wherein the second predetermined level represents an illumination level required to perform a successful facial recognition.

5. The electronic gaming machine of claim 1, wherein the first predetermined level is greater than zero and less than the second predetermined level.

6. The electronic gaming machine of claim 1, wherein, in response to recognition of a face, the processor further recursively:
   turns off the infrared light source for a second predetermined amount of time;
   sets the output level of the infrared light source to the first predetermined level;
   reads a third image via the infrared image acquiring device; and
   determines via the facial detection module if a face is still detected in the third image;
   until a face is not detected in the third image.

7. The electronic gaming machine of claim 6, wherein the second predetermined amount of time is less than the first predetermined amount of time.

8. The electronic gaming machine of claim 6, wherein the processor further periodically:
   sets the output level of the infrared light source to the second predetermined level;
   reads a fourth image via the infrared image acquiring device; and
   determines via the facial recognition module if a face detected in the fourth image matches the face detected in the second image.

9. The electronic gaming machine of claim 1, wherein at least one of the first predetermined amount of time or the second predetermined amount of time is randomly determined by the processor.

10. The electronic gaming machine of claim 1, wherein at least one of the first predetermined level or the second predetermined level is established via a calibration process.

11. A method of safely identifying a player of an electronic gaming machine, the electronic gaming machine comprising a cabinet housing, an infrared image acquiring device and an infrared light source each coupled to the cabinet housing and coupled to a processor, and a facial detection module and a facial recognition module, each operated by the processor in conjunction with the infrared image acquiring device and the infrared light source, the method comprising:

recursively:
- turning off the infrared light source for a first predetermined amount of time;
- setting an output level of the infrared light source to a first predetermined level;
- reading a first image via the infrared image acquiring device;
- determining via the facial detection module if a face is detected in the first image;
- in response to detection of a face:
  - setting the output level of the infrared light source to a second predetermined level;
  - reading a second image via the infrared image acquiring device; and
  - determining via the facial recognition module if a face is recognized in the second image.

12. The method of claim 11, wherein the infrared light source comprises at least one light-emitting diode.

13. The method of claim 11, wherein the first predetermined level represents an illumination level required to perform a successful facial detection.

14. The method of claim 11, wherein the second predetermined level represents an illumination level required to perform a successful facial recognition.

15. The method of claim 11, wherein the first predetermined level is greater than zero and less than the second predetermined level.

16. The method of claim 11, wherein, in response to recognition of a face, further
recursively:
- turning off the infrared light source for a second predetermined amount of time;
- setting the output level of the infrared light source to the first predetermined level;
- reading a third image via the infrared image acquiring device; and
- determining via the facial detection module if a face is still detected in the third image;
until a face is not detected in the third image.

17. The method of claim 16, wherein the second predetermined amount of time is less than the first predetermined amount of time.

18. The method of claim 16, wherein the processor further periodically:
- sets the output level of the infrared light source to the second predetermined level;
- reads a fourth image via the infrared image acquiring device; and
- determines via the facial recognition module if any face detected in the fourth image matches the face detected in the second image.

19. The method of claim 11, wherein at least one of the first predetermined amount of time or the second predetermined amount of time is randomly determined by the processor.

20. The method of claim 11, wherein at least one of the first predetermined level or the second predetermined level is established via a calibration process.

* * * * *